No. 884,694. PATENTED APR. 14, 1908.
W. A. WEANT.
AIR BRAKE.
APPLICATION FILED JAN. 28, 1908.
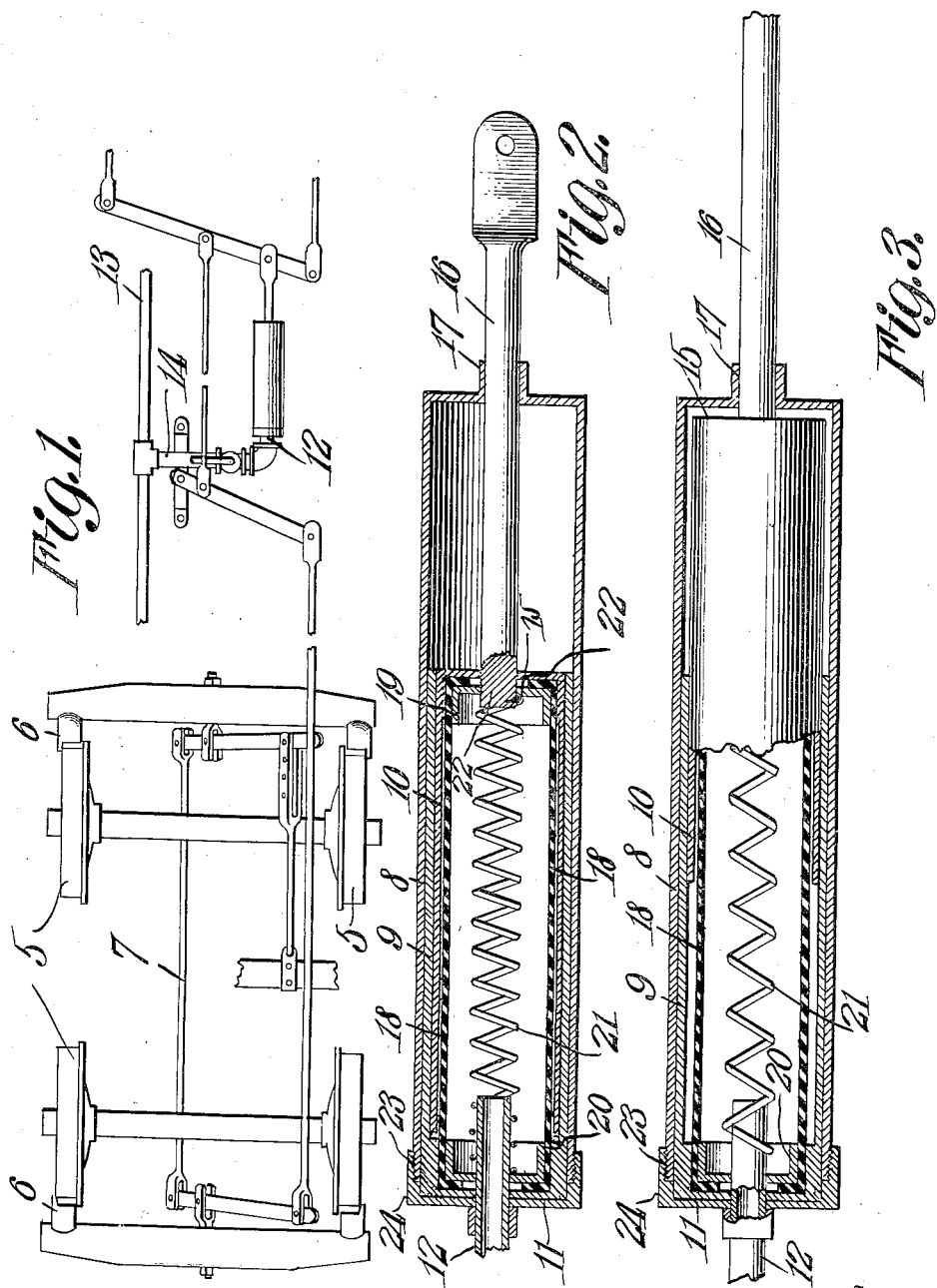
Witnesses
Inventor
William A. Weant.
By
Attorneys

UNITED STATES PATENT OFFICE.

WILLIAM A. WEANT, OF MOCKSVILLE, NORTH CAROLINA.

AIR-BRAKE.

No. 884,694.  Specification of Letters Patent.  Patented April 14, 1908.

Application filed January 28, 1908. Serial No. 413,050.

*To all whom it may concern:*

Be it known that I, WILLIAM A. WEANT, a citizen of the United States, residing at Mocksville, in the county of Davie and State of North Carolina, have invented a new and useful Air-Brake, of which the following is a specification.

This invention relates to air brakes for rail-way cars and other rolling stock and more particularly to the construction of the brake cylinder.

The object of the invention is to provide a brake cylinder in which the usual piston head and packing are dispensed with, thereby to prevent leakage and render the brake more efficient in operation.

A further object of the invention is to provide a brake including telescopic members connected by a flexible sleeve or tube which expands when fluid is admitted thereto and actuates the brake rod or stem to apply the brakes.

A further object of the invention is to provide means for returning the telescopic members automatically to normal position after each application of the brakes thereby to release the brakes.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a bottom plan view of an air brake constructed in accordance with my invention showing the same connected with the brake rigging. Fig. 2 is an enlarged longitudinal sectional view of the brake cylinder detached, the telescopic members being shown in normal or inoperative position. Fig. 3 is a similar view showing the parts in extended or operative position.

Similar numerals of reference indicate corresponding parts in all of the figures of the drawings.

The improved air brake forming the subject matter of the present invention is principally designed for attachment to freight cars, passenger cars and other rail-way rolling stock and in the present instance is shown in connection with a car of the ordinary construction in which 5 designates the truck wheels and 6 the brake shoes connected through the medium of the usual rigging 7 with the brake cylinder.

The device consists of a cylindrical casing or housing 8 in which is arranged a pair of telescopic members 9 and 10, one of said members being stationary and the other movable to extended position, as shown. The forward end of the stationary cylinder 9 is open while the rear end 11 is pierced by a tube or pipe section 12 which communicates with the train brake pipe 13 through the medium of a branch pipe 14. The member 10 is slidably mounted in the member 9 and is provided at its forward end with a head 15 carrying a brake rod or stem 16, the latter being extended through a bearing 17 in the adjacent end of the housing 8 and operatively connected with the brake rigging, as shown. The relatively stationary and movable members 9 and 10 are connected by an elastic sleeve 18 preferably formed of rubber and of a length equal to the length of said members when the latter are in contracted or inoperative position. One end of the elastic sleeve 18 is secured to the head 15 of the movable head 10 by means of a retaining ring or cap 19, while the opposite end of the sleeve is secured to the head 11 of the stationary sleeve 9 by a similar retaining ring or cap 20, thereby to firmly anchor the sleeve in both members. The annular flanges of the caps 19 and 20 bear against and force the adjacent side walls of the elastic sleeve in contact with the interior walls of the members 9 and 10 while the circular body portions of the retaining caps engage the adjacent ends of the elastic sleeve and force the latter against the heads 11 and 15.

The pipe section 12 projects a short distance within the elastic sleeve 18 and surrounding the projecting end of said pipe section 12 is one end of a coiled spring 21, the opposite end of which is fastened in any suitable manner to a lug or extension 22 on the head 15 so that when the members 8 and 9 are in extended position and the air in the sleeve exhausted, the spring 21 will automatically return said members to contracted or inoperative position thereby to release the brakes. One end of the casing or housing 8 is threaded at 23 for engagement with a correspondingly threaded cap or closure 24 so that the housing may be readily removed to expose the telescopic members when the latter need repairs. The casing 8 forms a housing for the telescopic members and serves to prevent the entrance of dust, dirt and other foreign matter to the working parts of the device. It will thus be seen that when air is admitted through the pipe 12 to the interior of the elastic sleeve 18 the latter will be forced longitudinally of the casing or housing and carry with it the brake rod 16 thus actuating the brake rigging to operate the brake shoes 6 in the usual manner, as best shown in Figs. 1 and 3 of the drawings. When the air is exhausted from the flexible sleeve the spring 21 will automatically return the parts to the position shown in Fig. 2 of the drawings thus retracting the brake rod 16 and automatically releasing the brakes. Attention is here called to the fact that the telescopic section 10 slides freely within the section 9, the elastic sleeve being effectually housed within the telescopic members or sections when the latter are in both operative and inoperative positions.

While the brake cylinder is shown in connection with the usual form of brake rigging it is obvious that the same may be used with equally good results on any other approved type of brake rigging.

Having thus described the invention what is claimed is:

1. A brake cylinder including telescopic sections, an elastic member connecting said sections, and a brake actuating member carried by and movable with one of the sections.

2. A brake cylinder including telescopic sections, an elastic sleeve connecting said sections and normally housed within the same, a brake actuating member carried by and movable with one of the sections, and means for supplying fluid to the interior of the sleeve.

3. A brake cylinder including relatively stationary and movable telescopic sections, an elastic sleeve connecting said sections, a brake actuating member carried by the movable section, and a conductor projecting within the elastic sleeve for supplying fluid to the latter.

4. A brake cylinder including telescopic sections, a flexible member connecting said sections, a conductor for supplying fluid to the interior of the sleeve to move one of the sections to extended position, a brake actuating member carried by the movable section, and means disposed within the sleeve for returning the movable section to retracted position when the fluid is exhausted from the sleeve.

5. A brake cylinder including relatively stationary and movable telescopic sections, an elastic sleeve connecting said sections, a conductor for supplying fluid under pressure to the interior of the sleeve, a brake actuating member carried by the movable section, and a casing forming a housing for said sections.

6. A brake cylinder including a casing, relatively stationary and movable telescopic sections disposed within the casing, an elastic sleeve connecting said sections, a brake rod carried by the movable section, a conductor for supplying fluid under pressure to the interior of the elastic sleeve for extending the movable section, and a spring disposed within the elastic sleeve for retracting said sections when the fluid is exhausted from the sleeve.

7. A brake cylinder including relatively stationary and movable sections each having one end thereof open and its opposite end provided with a head, an elastic sleeve connecting the heads, retaining rings bearing against the elastic sleeve for locking the latter in engagement with the heads, a conductor piercing the head of one of the sections for admitting air to the interior of the sleeve, a brake rod carried by the head of the mating section, a lug projecting from the head of said mating section, and a spring engaging the fluid conductor and lug, respectively, for retracting the movable section when the fluid is exhausted from the sleeve.

8. A brake cylinder including a casing having a removable closure, relatively stationary and movable telescopic sections arranged within the casing and each having one end thereof open and its opposite end provided with a head, an elastic sleeve connecting said sections, retaining caps for securing the adjacent ends of the elastic sleeve in engagement with the heads of the sections, said caps being formed with annular flanges adapted to bear against the walls of the elastic sleeve, a pipe section piercing the head of one of the sections for supplying fluid under pressure to the interior of the sleeve, a brake rod carried by the head of the mating section and extending through an opening in the adjacent end of the casing, a lug projecting inwardly from the head of the mating section, and a coiled spring disposed within the flexible sleeve and surrounding the fluid conductor and lug, respectively.

In testimony that I claim the foregoing as my own, I have hereto affixed my signature in the presence of two witnesses.

WILLIAM A. WEANT.

Witnesses:
J. W. RODWELL,
J. F. MOORE.